United States Patent [19]
Gelon et al.

[11] Patent Number: 6,073,888
[45] Date of Patent: Jun. 13, 2000

[54] SEQUENCED HEAT REJECTION FOR BODY STABILIZED GEOSYNCHRONOUS SATELLITES

[75] Inventors: Walter S. Gelon, Redwood City; John C. Hall, Rancho Palos Verdes; Christian J. Goodman, Fremont, all of Calif.

[73] Assignee: Loral Space & Communications, Ltd., Rolling Hills Estates, Calif.

[21] Appl. No.: 09/203,710

[22] Filed: Dec. 2, 1998

[51] Int. Cl.$^7$ ..................................................... B64G 1/46
[52] U.S. Cl. ...................... 244/163; 165/41; 165/104.22; 165/104.31
[58] Field of Search ............................ 244/158 R, 117 A, 244/163; 165/104.22, 104.23, 41, 104.31, 104.34, 104.33, 904, 133, 32

[56] References Cited

U.S. PATENT DOCUMENTS

| | | | |
|---|---|---|---|
| 5,257,660 | 11/1993 | Cargile ................................ | 165/104.22 |
| 5,267,605 | 12/1993 | Doty et al. ................................ | 165/41 |
| 5,269,146 | 12/1993 | Kerner ................................ | 165/104.33 |
| 5,332,030 | 7/1994 | Spencer et al. ......................... | 244/163 |
| 5,395,706 | 3/1995 | Hall .......................................... | 429/50 |
| 5,652,073 | 7/1997 | Lenhart et al. ......................... | 429/210 |
| 5,669,584 | 9/1997 | Hickey ................................... | 244/163 |
| 5,954,298 | 9/1999 | Basuthakur et al. .................... | 244/163 |

OTHER PUBLICATIONS

Handbook of Applied Thermal Design, E.C. Guyer, Editor in Chief, McGraw–Hill Book Company, "Heat Pipes", pp. 7–50 through 7–58, 1989.

Chalmers, D.R. et al., "Advanced Communications Satellite Thermal Design Using Variable East/West Radiators", AIAA 24$^{th}$ Aerospace Sciences Meeting, Jan. 6–9, 1986, 8 pages.

*Primary Examiner*—Galen L. Barefoot
*Attorney, Agent, or Firm*—Perman & Green, LLP

[57] ABSTRACT

In one embodiment, a thermal radiative system for an earth orbiting satellite including a plurality of faces intermittently exposed to maximum solar illumination comprises a thermal radiator is mounted on a face for discharging heat from a thermal load to deep space. A heat conductor extends between the thermal load and the thermal radiator. Thermal switches are operable for connecting the thermal load to the thermal radiator for cooling when the temperature of the thermal load is above a predetermined level and for disconnecting the thermal load from the thermal radiator when the temperature of the thermal load falls below the predetermined level. A shield including phase change management (PCM) material is thermally connected to the thermal load for drawing heat away therefrom. In another embodiment, first and second thermal radiators are mounted on first and second faces, respectively, of the satellite for discharging heat from the thermal load and the thermal load is sequentially connected to the first and second thermal radiators to achieve optimum discharge of heat from the thermal load. To this end, the thermal load is thermally connected to the first radiator so long as the first radiator is exothermic and thermally disconnected from the first radiator when the first radiator becomes endothermic and is thermally connected to the second radiator so long as the second radiator is exothermic and thermally disconnected from the second radiator when the second radiator becomes endothermic.

21 Claims, 5 Drawing Sheets

FIG. 6

SEQUENCED HEAT REJECTION FOR BODY STABILIZED GEOSYNCHRONOUS SATELLITES

BACKGROUND OF THE INVENTION

1. Field of the Invention

The present invention relates generally to earth-orbiting satellites, especially those in a geosynchronous orbit. A primary goal of the invention resides in increasing satellite payload capacity while moderating thermal transients in satellite equipment. Diurnal solar loading on the surfaces of a satellite presently has limited use east/west and aft radiators to control equipment which operates either discontinuously or at very high temperatures. This invention utilizes devices such as variable conduction head pipes (VC HP$_s$), diode head pipes (DHP$_s$) and phase change materials to sequentially connect and disconnect east/west/earth/anti-earth radiators to increase satellite heat dissipation capability. This invention permits higher thermal dissipation in current spacecraft design thus permitting the use of larger, more powerful, payloads without the need for costly redesign. Although the term geosynchronous satellite is used throughout the disclosure, it will be understood that the invention is applicable to any orbiting satellite with surfaces which are periodically exposed to direct solar illumination.

2. Description of the Prior Art

High power geosynchronous spacecraft are constrained in their power capability by, among other factors, the degree to which they can reject waste heat. Heat rejection can be increased by:

increasing the size of the satellite body, leading to heavier satellites, and thus higher costs; and use of deployable thermal radiators which intrinsically add cost and mass to the satellite.

It was with knowledge of the foregoing state of the technology that the present invention has been conceived and is now reduced to practice. The actuation and deployment concept embodied by this invention is different from all of the devices reviewed above. Furthermore, this system can easily be implemented in existing as well as in new spacecraft without significant alterations in the design.

SUMMARY OF THE INVENTION

The present invention focuses on increasing satellite heat rejection capability by utilizing radiative surfaces which are exposed to direct sunlight on an intermittent basis. The consequences of the direct solar exposure are a large increase in the radiator surface temperatures due to degradation of the, absorbtance, α, value of the space radiator over the mission lifetime (typically 15 years). This high temperature precludes utilization of these surfaces as radiators for continuously operating electronic equipment which is normally constrained to a maximum mounting surface temperature of +55° C. The result is that these surfaces are only employed for equipment which can withstand high temperatures above 55° C., such as, for example, OMUX (an output multiplexer) and intermittently operated equipment such as, for example, Ni/H$_2$ batteries.

For a body stabilized geosynchronous satellite 20 traveling in its orbit 22 (FIGS. 1 and 2), four out of the six usual satellite surfaces are exposed to direct solar illumination on a 24 hour basis. As can be seen especially well in FIG. 2, over a 24 hour orbital day, only north and south faces 24, 26 (FIG. 1), respectively, of the satellite 20 escape direct solar illumination although even these faces are subject to 23.5° incident angle for solar illumination in solstice, further limiting satellite thermal dissipation capacity. Therefore, with a right prismatic geometry, 67% of the satellite surface area is unavailable for electronic equipment which operates continuously at about +55° C. This, in turn, substantially limits high power capability of satellites and may lead to either multiple satellites for a single mission or larger body size satellites. Both of these solutions add cost.

The present invention teaches two approaches for continuous utilization of these radiator surfaces. Such utilization becomes advantageous as the heat rejection for periodically operating equipment decreases and/or continuous equipment loading is decreased with high temperature heat pipe cross strapping. The two proposed approaches are.

(1) connect the thermal load to a phase change management (PCM) material which is in turn connected to an intermittently available radiative surface with a variable conduction heat pipe (VCHP) or diode heat pipe (DHP); or (2) connect the thermal load to two or more opposed intermittently available radiative surfaces (east/west or earth/anti-earth) with sets of thermal conductors such as VCHPs or diode head pipes (DHPs) which will not conduct heat from a hot radiator to the internal equipment.

A primary feature, then, of the present invention is the provision of a technique for increasing satellite payload capacity while moderating thermal transients in satellite equipment.

Another feature of the present invention is the provision of such a technique which utilizes phase change management (PCM) material, variable conduction or diode heat pipes (VCHPs and DHPs), east/west/earth/anti-earth radiators, and high temperature heat pipes to increase satellite heat dissipation capability.

Still another feature of the present invention is the provision of such a technique which permits higher thermal dissipation in current spacecraft design thus permitting the use of larger, more powerful, payloads without the need for costly redesign.

Yet another feature of the present invention is the provision of such a technique according to which the transfer of satellite thermal dissipation is sequenced such that the dissipation occurs only at radiators where a net positive heat transfer out of the satellite is possible even if the radiators are subjected to some solar loading.

Still a further feature of the present invention is the provision of such a technique which may be accomplished in conjunction with a PCM thermal material which acts to provide thermal control when the radiative surface is subjected to high incident thermal radiation and the radiative surface is thus decoupled from the thermal load using a VCHP or DHP.

Yet a further feature of the present invention is the provision of such a technique accomplished with variable conductance heat pipes or a diode head pipe which alternately connect and disconnect the thermal load to the radiator depending on whether on not the radiator is subjected to sufficient solar thermal backloading to wipe out the dissipation gain from the backloaded radiator.

Still another feature of the present invention is the provision of such a technique which involves connecting a centrally located thermal load to two oppositely phased radiators with VCHPs or DHPs such that the load is alternately connected to unloaded radiative surfaces.

Yet a further feature of the present invention is the provision of such a technique which involves internally mounting the thermal load just described.

Another feature of the present invention is the provision of such a technique which involves implementation of the sequenced radiator concept by extending north and south equipment panels through 90' bends onto the east and west satellite surfaces.

Still another feature of the present invention is the provision of such a technique which involves the utilization of sequenced radiators as a means of implementing internal isothermal equipment.

Yet another feature of the present invention is the provision of such a technique which involves freeing up additional east and west surface area on the satellite for electronic type loads (55° C.) by cross strapping high temperature loads with high capacity heat pipes.

Yet a further feature of the present invention is the provision of such a technique which involves reducing the heater power required for high temperature east-west equipment by the heat pipe cross strapping described above.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms.

Like numerals refer to like parts throughout the disclosure.

DETAILED DESCRIPTION OF THE PREFERRED EMBODIMENTS

Figure 1:
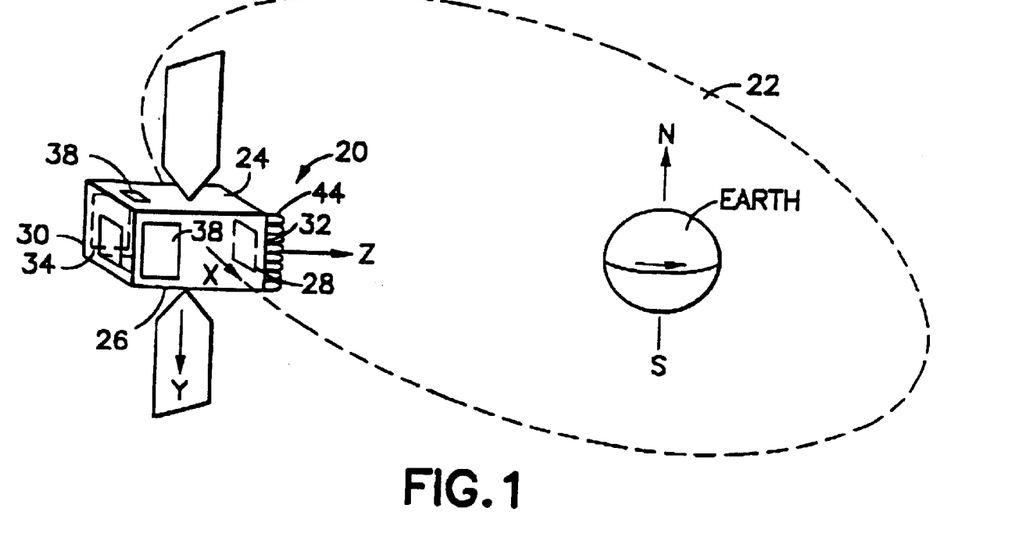
FIG. 1 is a diagrammatic representation, in perspective, of an body stabilized satellite traveling in a geosynchronous orbit about the earth and embodying the thermal radiative system of the invention.
Figure 2:
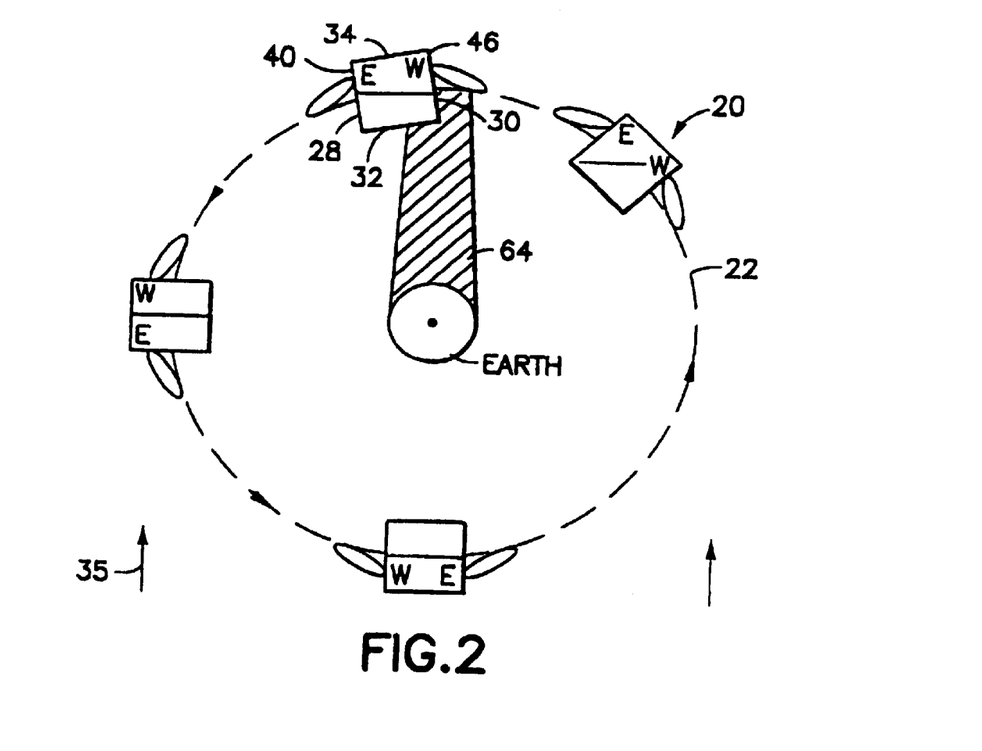
FIG. 2 is a plan view of all components illustrated in FIG. 1.

Turning again to the drawings and, continuing with reference to FIGS. 1 and 2, which generally illustrate a body stabilized satellite 20 exhibiting x, y, and z axes and traveling in a geosynchronous orbit 22 about the earth and having north and south faces 24, 26, respectively, east and west faces 28, 30, respectively, and earth and anti earth faces 32, 34, respectively. Solar radiation is indicated by arrows 35. Each face is suitably provided with a radiator for discharging heat to deep space from associated equipment mounted on the satellite, both internally and externally and heat conduction arteries (not illustrated in these views) serve to transmit heat from such equipment to its associated radiator. Of course, for optimum efficiency, it is desirable for the heat conduction arteries to be of minimal length.

Figure 3:
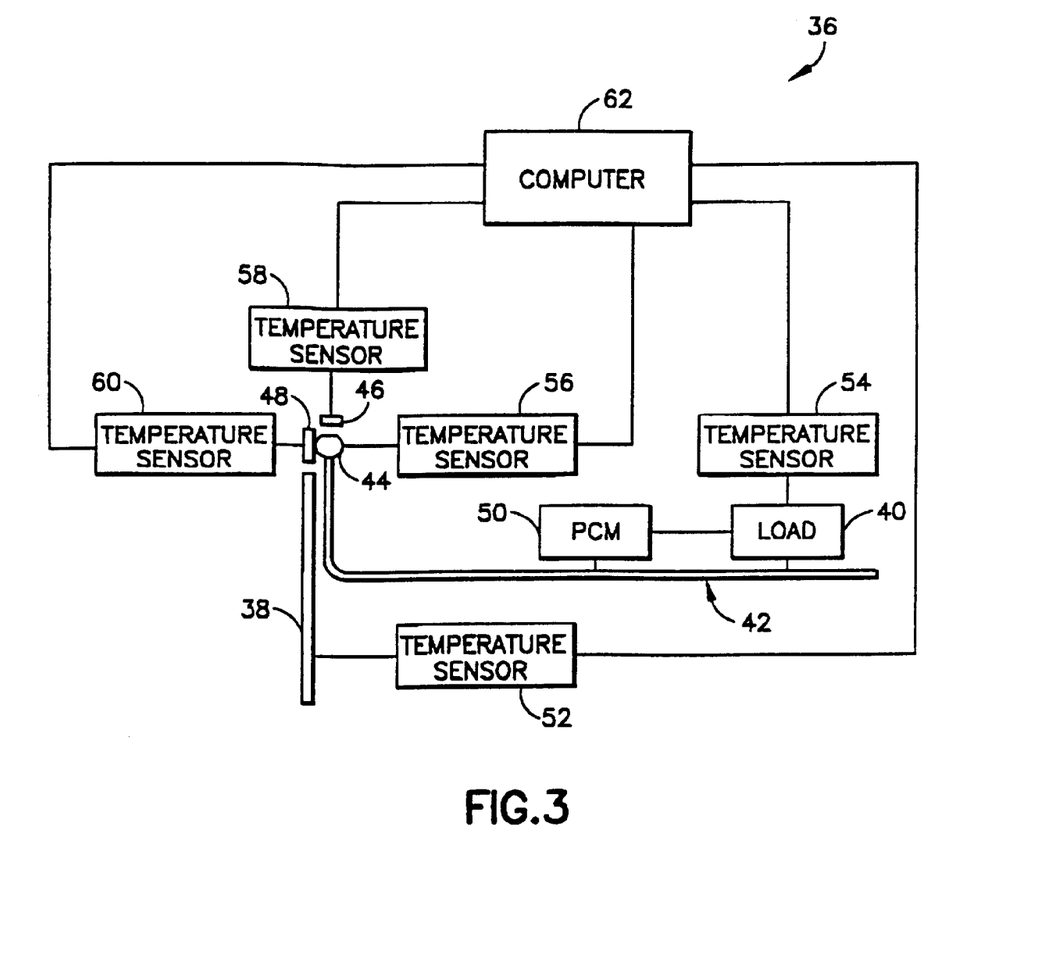
FIG. 3 is a diagrammatic representation of one embodiment of the thermal radiative system of the invention.

The first approach proposed by the invention as related above is schematically illustrated in FIG. 3 depicting a thermal radiative system 36 for the earth orbiting satellite 20 which, as earlier stated, includes a plurality of faces 24–34 which are intermittently exposed to solar illumination. The system 36 comprises a thermal radiator 38 mounted on a face of the satellite 20 for discharging heat from a thermal load 40 to deep space, a heat conductor 42 extending between the thermal load and the thermal radiator, and a thermal switch 44 which is operable for connecting the thermal load to the thermal radiator means for cooling when the temperature of the thermal radiator below the temperature of the thermal load and for disconnecting the thermal load from the thermal radiator means when the temperature of the thermal radiator is above the temperature of the thermal load.

One way of accomplishing this process is through the use of a variable conduction heat pipe (VHCP, heat conductor 42) which can commandably be turned on or off. Such heat pipes (described for example in the Handbook of Applied Thermal Design, E. C. Guyer, Editor in Chief, McGraw-Hill Book Company, New York, etc., 1989, pages 7–50 through 7–58) are built with a non-condensable gas reservoir (thermal switch 44). For example, viewing FIG. 3, heating a non-condensable gas such as nitrogen in the reservoir causes it to expand and force the condensable gas back into the heat pipe in fluid communication therewith thereby restricting the length over which the heat pipe acts to conduct heat to the radiator 38 and alternatively heating and cooling the noncondensable gas will act to disconnect or connect the thermal load 40 to the radiator. Also associated with the thermal switch/reservoir 44 are a heater 46 for heating the noncondensable gas and a radiator 48 for drawing heat away from the reservoir.

It is noteworthy that the same effect could be achieved with other forms of thermal switching, for example, a diode heat pipe or a thermal joint based on a fusible alloy or the inflation of a helium bladder. The critical feature for purposes of the invention is passive or active commandability of the thermal connection between the heat source and the heat rejection system.

A thermal mass 50 may optionally be connected to the thermal load 40 for buffering against temperature extremes. For example, the thermal mass may include phase change management (PCM) material thermally connected to the thermal load for isothermally storing heat from the thermal load. The PCM material may be contained in a suitable reservoir and be of a nature which begins to melt when its temperature is above a predetermined transition temperature and which begins to freeze when its temperature is below the transition temperature.

Desirably, the thermal radiative system 36 also includes a sensor for detecting the temperature of the thermal radiator, a load sensor 54 for detecting the temperature of the load, and additional temperature sensors 56, 58, 60 for detecting the temperatures, respectively, of the reservoir 44, heater 46, and VCHP radiator 48. A suitable computer 62 is responsive to the various sensors for operating the thermal switch when the temperature difference between the radiator sensor and the load sensor is greater than a predetermined value. In another manner of speaking, the computer operates the thermal switch in one instance when the net heat transfer from the thermal radiator 38 is endothermic and in another instance when the net heat transfer from the thermal radiator is exothermic.

When the surface of the radiator 38 is shadowed, the VCHP conducts and both the thermal load 40 and the PCM material 50 are cooled. This process cools the thermal load and leads to a phase change in the PCM material (e.g., evidenced by freezing). When the radiator 38 is illuminated by the sun, the VCHP 42 shuts down. Excess heat produced by the thermal load 40 is absorbed by the PCM material (e.g., evidenced by melting). The net result is that a previously underutilized or unutilized surface of the satellite 20 can now act as a radiator for continuously operating loads. This operation may be enhanced by timing the operation of the VCHP 42 such that it turns off only after the angle of solar illumination exceeds a prescribed critical value and the net thermal balance becomes unfavorable.

The second approach proposed by the invention as related above is to sequence the thermal load between two or more radiators whose solar thermal loading is out of phase. The east and west faces 28, 30 of the satellite 20 are good examples. In a geosynchronous satellite, these faces are alternately illuminated by the sun but cannot be simultaneously illuminated.

Figure 4:
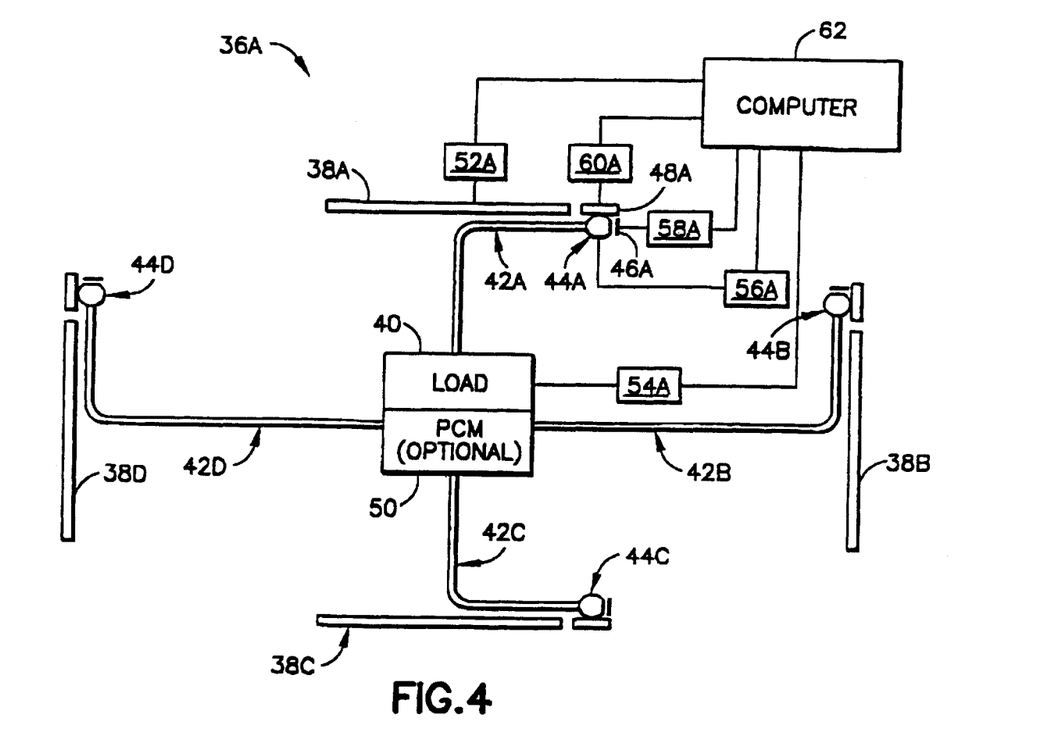
FIG. 4 is a diagrammatic representation of another embodiment of the thermal radiative system of the invention.

Turn now to FIG. 4 which diagrammatically illustrates a modified thermal radiative system 36A. As an alternative to the PCM material approach, when the surfaces of symmetrical radiators 38A, 38B, 38C, 38D (but at least two such surfaces) are available, the thermal load 40, when centrally located, can be coupled in a sequential fashion to those surfaces with VCHPs 42, 42A, 42B, 42C, 42D. This approach is schematically illustrated in FIG. 4.

When one radiator in FIG. 4 is solar illuminated, the VCHP 42 disconnects the load from this radiator while the opposite VCHP connects the load to the unilluminated radiator. Solar heating of the load is prevented, the load can continue to dissipate heat through the unilluminated radiator, and the load can be designed to operate at a lower temperature. This approach represents a fundamental improvement on the first approach in that it increases the net heat dissipation as opposed to reducing temperature excursions.

The basic concept applied only to the east and west faces has appeared in the literature. See, for example, D. R Chalmers and J. J. Pustay, "Advanced Communications Satellite Thermal Design Using Variable East/West Radiators", AIAA 24$^{th}$ Aerospace Sciences Meeting, Jan. 6–9, 1986, Reno, Nevada. The thermal radiative system of FIG. 4, however, improves and broadens this concept in several fashions:

(1) it incorporates a discrete controller of the VCHP 42 via the VCHP radiator 48 and heater 46;

(2) the approach in the present invention takes advantage of between two and four of the intermittently illuminated satellite faces; and (3) the approach in the FIG. 4 embodiment allows the combination of a sequenced VCHP 42 with the PCM material 50 previously described.

More specifically, the thermal radiative system 36A comprises a plurality of thermal radiators 38A, 38B, 38C, 38D, each mounted on a respective face of the satellite 20 for discharging heat from the thermal load 40 to deep space.

Similarly, a plurality of elongated heat conductors 42A, 42B, 42C, 42D (VCHPs, for example) extend between the thermal load and an associated one of the radiators. Thermal switches 44A, 44B, 44C, 44D are each operable for sequentially connecting the thermal load to its associated thermal radiator so as to achieve optimum discharge of heat from the thermal load to deep space. In this instance, as in the system 36, phase change management (PCM) material 50 may be thermally connected to the thermal load for drawing heat away from the thermal load. In any event, the thermal switches 44A, 44B, 44C, 44D are operable for connecting the thermal load to the thermal radiator 38A when the difference in temperature between the thermal load and the thermal radiator 38A is greater than a predetermined level and for simultaneously disconnecting the thermal load from one or more of the thermal radiators 38B, 38C, 38D when the difference in temperature between the thermal load and any of those thermal radiators is below a predetermined level. Similarly, the thermal switches 44A, 44B, 44C, 44D are operable for connecting the thermal load to the thermal radiator 38B when the difference in temperature between the thermal load and the thermal radiator 38B is greater than a predetermined level and for simultaneously disconnecting the thermal load from one or more of the thermal radiators 38A, 38C, 38D when the difference in temperature between the thermal load and any of those thermal radiators is below a predetermined level.

The system of the invention illustrated in FIG. 4 relating to each of the thermal radiators 38A, 38B, 38C, 38D, is similar to that illustrated in FIG., 3 but multiplied by the number of thermal radiators mounted on the satellite.

The conduction/non-conduction function of each VCHP is determined by the volume of the non-condensable gas which is in turn determined by the temperature of the gas reservoir. Proper sizing and operation of the VCHP radiator and heater allows the controller on/off function to be determined not by whether the radiator is sun illuminated (implied by Chalmers and Pustay, supra.) but whether the net heat transfer from the sun illuminated radiator is endothermic or exothermic which, in turn, depends on the magnitude of the thermal load and the age of the radiator, because the absorptivity, $\alpha$, of the radiator degrades (increases) with age causing it to absorb more heat when solar illuminated.

Such control is possible with the advanced VCHP heater/radiator features in FIG. 4 (these are not described in the reference of Chalmers and Pustay, supra.). The VCHP described in the Chalmers and Pustay reference comprises a heat pipe combined with a non-condensable gas reservoir. The inert gas charge is selected to prevent the condensable gas vapor from reaching the heat pipe condenser until the temperature of the evaporator has passed a selected value which in turn determines the on/off temperature. See, for example, "Handbook of Applied Thermal Design", E C Guyer, Ed., McGraw-Hill Book Company, 7–50 through 7–58 (1989). In the advanced heat pipe configuration illustrated in FIG. 4, however, the pressure of the non-condensable gas is determined by the VCHP radiator and heater. These subsystems determine inert gas pressure which in turn determines whether or not the condensable gas reaches the heat pipe condenser section. Thus, the control functions of the advanced VCHP allow tuning of the conduction/non-conduction function based on whether or not net heat transfer from the sunlit radiator is exothermic or endothermic.

Figure 5:
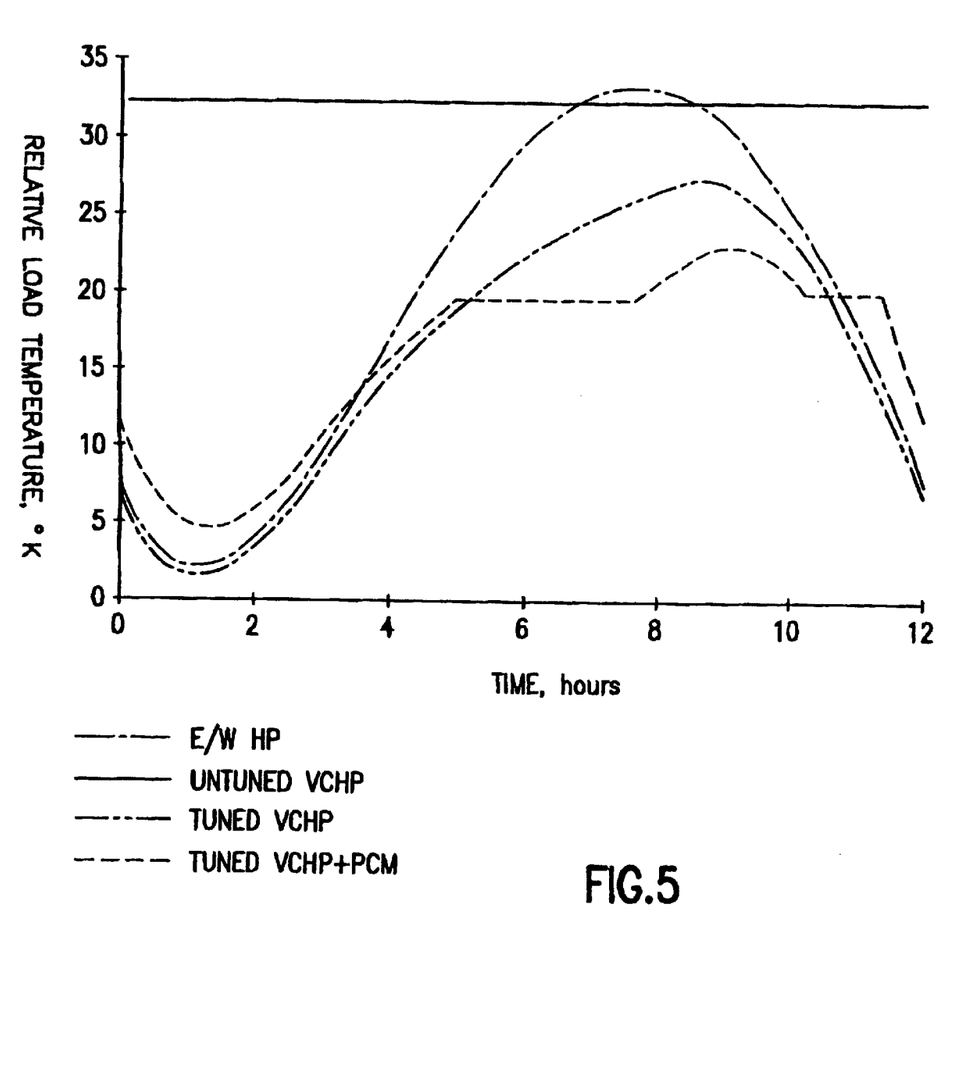
FIG. 5 is a graph presenting performance modeling of options of radiator utilization, based on a 12 hour periodic cycle, of two 180° opposed sunlit surfaces on a body stabilized satellite traveling in a geosynchronous orbit about the earth.

The extended capability which results from discreet control of the VCHP is illustrated in FIG. 5 for a radiation system comprising two 180° opposed radiators. Discreet control ("Tuned VCHP" in FIG. 5) is compared with the Chalmers and Pustay, supra., reference ("Untuned VCHP") and a solution in which the two faces are directly coupled with uncontrolled heat pipes ("E/W HP"). As can be seen for the selected set of input conditions the Chalmers and Pustay, supra., reference is only slightly better (peak temperature ≈1° lower) than a solution in which the two radiators are directly coupled with uncontrolled heat pipes. On the other hand, the "Tuned VCHP" solution lowers the peak temperature by approximately 6° C. and 5° C. respectively versus the heat pipe and "Untuned VCHP" solutions.

The function of the PCM material 50 is to buffer temperature extremes as opposed to increase heat dissipation. As can be seen in FIG. 5, incorporation of the PCM material with a controllable VCHP moderates temperatures excursions and thereby further extends the capability of the present invention in which heat dissipation varies on a diurnal basis. With the particular model conditions chosen for the FIG. 5 analysis of the PCM material leads to a further 5° C. lowering in peak temperature.

Coupling additional intermittent radiator surfaces into the system, as would be expected, still further enhances heat dissipation capability. Preliminary analyses have been carried out on a three radiator system (east, west and anti-earth) with the previously described analysis conditions.

Figure 6:
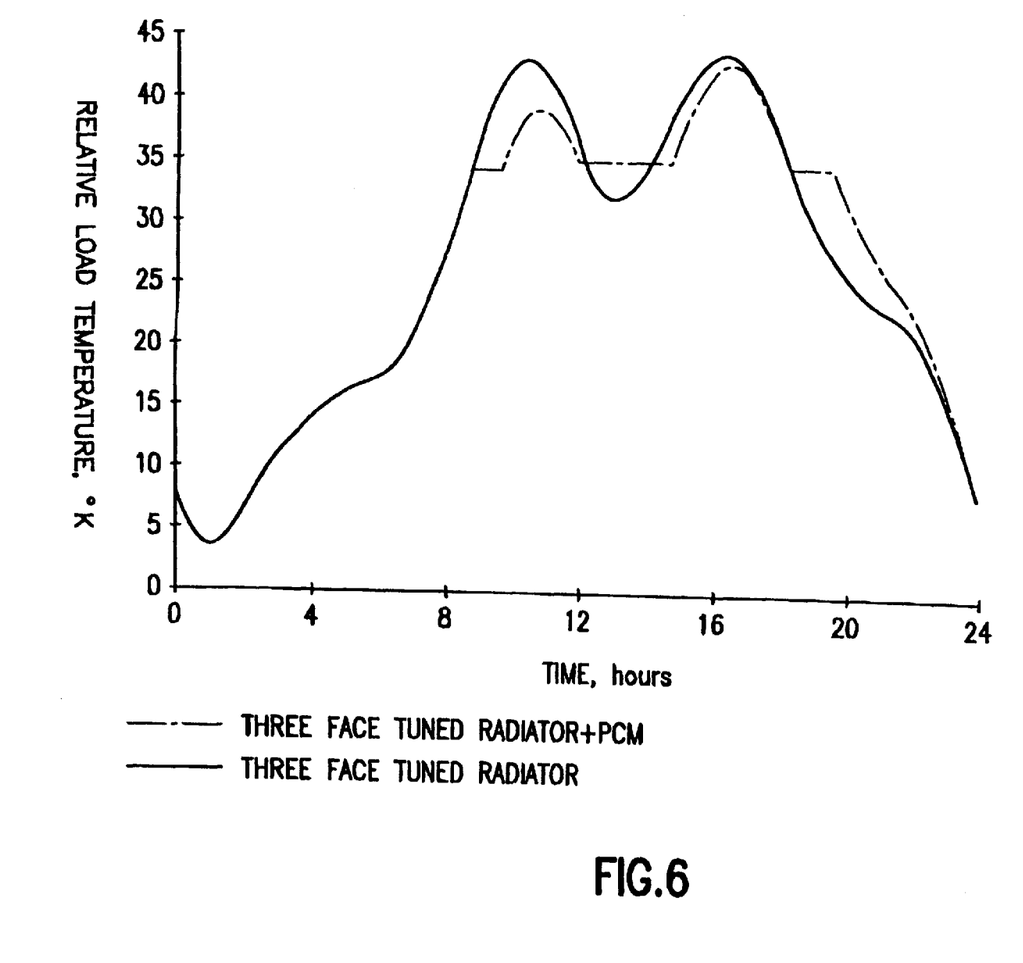
FIG. 6 is a graph presenting performance modeling of options of radiator utilization, based on a 24 hour periodic cycle, of three opposed sunlit surfaces (east, west, anti-earth) on a body stabilized satellite traveling in a geosynchronous orbit about the earth.

The significance of the data in FIG. 6 is that total dissipation is increased by about 40% versus the case reported in FIG. 5. As none of these surfaces are presently exploited in present satellites, it improves performance by the same amount without sacrificing any existing satellite capability. This represents a potential 40% payload increase when thermal dissipation is the limiting factor.

The FIG. 4 approach has additional advantages in that it facilitates equipment mounting on internal spacecraft decks. It thus adds a degree of design flexibility to the spacecraft as it does not physically consume satellite surface area. It would be ideal, for example, for mounting a central payload processor with very high dissipation requirements.

The concept might also be implemented as a means of cooling internally mounted equipment which is capable of operation at very high temperatures. An example of such equipment is an output multiplexer (OMUX which filters the Rf outputs for a communication satellite. The OMUX is a non-electronic component and is capable of operating at temperatures above 100° C. and is customarily placed external to the spacecraft on the east and west faces. It would be a decisive advantage if the OMUX could be mounted internally to avoid the diurnal dimensional changes induced between east and west external OMUXs by the alternating shadow versus solar illumination effect. Diurnal temperature variations are often reduced by using heater power to raise the low end when the sun is on the other side. Sequenced radiators connected to central internal OMUXs would increase spacecraft dissipation capability and reduce heater power requirements and allow and internal OMUX to operate at higher (more efficient) temperatures than are presently possible with a 55° C. internal spacecraft temperature.

Figure 7:
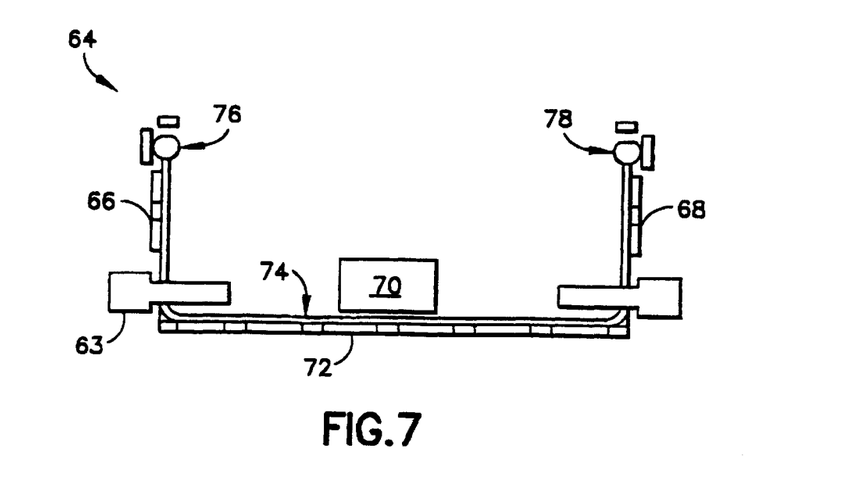
FIG. 7 is a diagrammatic representation of still another embodiment of the thermal radiative system of the invention.

An alternative implementation approach for the FIG. 4 approach would be to "bend" the north and south radiators onto the east and west surfaces as indicated in another modified thermal radiative system 64 (see FIG. 7). In this case, for example, the horizontal north and south equipment panel heat pipes could be replaced with VCHPs (or diode heat pipes) which would bend at 90' onto the east and west surfaces. For a communications satellite, some allowance would have to be provided for TWTA (traveling wave tube amplifier) 63 installation between the VCHP and TWTA direct radiator for back soak onto the east west extensions. However the concept does lead to a net weight savings by elimination of redundant equipment (horizontal heat pipes and VCHPs replaced with just VCHPs), miming thermal joint conduction losses and possibly reducing thermal joint mass.

More specifically, in this embodiment, the thermal radiative system 64 for an earth orbiting satellite including a plurality of faces comprises thermal radiators 66, 68 mounted on opposed faces of the satellite. In a typical fashion, the radiators 66, 68 mounted on east and west faces of the satellite such that they are intermittently exposed to maximum solar illumination for recurrently discharging heat from a thermal load 70 to deep space. A third thermal radiator 72 is mounted on a face of the satellite, for example, a north face or a south face, which is minimally exposed to solar illumination for continuously discharging heat from the thermal load to deep space.

A heat conductor 74, which may be a VCHP, extends between the thermal load 70 and each of the thermal radiators 66, 68, 72, the heat conductor continuously thermally connecting the thermal load to the radiator 72, but only intermittently to the radiators 66, 68. The system 64 also includes a pair of thermal switches 76, 78 at opposite ends of the means operable for thermally connecting the thermal load to the radiators 66,68, sequentially, so as to achieve optimum discharge of heat from the thermal load 70 to deep space. In this regard, the thermal switch 76 is operable for connecting the thermal load to its associated radiator 66 when the difference in temperature between the thermal load and that radiator is greater than a predetermined level and for simultaneously disconnecting the thermal load from the radiator 68 when the difference in temperature between the thermal load and that radiator is below a predetermined level. Additionally, the thermal switch 78 is operable for connecting the thermal load to its associated radiator 68 when the difference in temperature between the thermal load and that radiator is greater than a predetermined level and for simultaneously disconnecting the thermal load from the radiator 66 when the difference in temperature between the thermal load and that radiator is below a predetermined level.

Finally the available east and west surface area for the FIG. 4 approach is constrained by the present location of OMUXs on these surfaces. However, the area required for the OMUXs can be reduced if high capacity and high temperature crossing heat pipes (for example using water as the working fluid) are used to balance the thermal load between the east and west side OMUXs. This has the added advantage of lowering OMUX heater power.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A thermal radiative system for an earth orbiting satellite including a plurality of faces intermittently exposed to maximum solar illumination, said system comprising:

thermal radiator means mounted on a face of the satellite for discharging heat from a thermal load to deep space;

heat conduction means extending between the thermal load and said thermal radiator means;

thermal switch means operable for connecting the thermal load to said thermal radiator means for cooling when the temperature of the thermal load is above a predetermined level and for disconnecting the thermal load from said thermal radiator means when the temperature of the thermal load falls below the predetermined level, said thermal switch means including:

an elongated heat pipe including a length thereof in heat transfer proximity of said radiator means;

a gas reservoir in fluid communication with said heat pipe containing an entire charge of both a condensable gas and an inert non-condensable gas; and selectively operable heater means for heating said gases in said gas reservoir such that, when said heater means is operated, said non-condensable gas expands and forces said condensable gas into said heater pipe thereby disconnecting the thermal load from said thermal radiator means and, such that, when said heater means is not operated said condensable gas and said non-condensable gas both retreat into said gas reservoir thereby disconnecting the thermal load from said thermal radiator means; and thermal mass means thermally connected to the thermal load for buffering against temperature extremes.

2. A thermal radiative system as set forth in claim 1 wherein said thermal mass means includes phase change management (PCM) means thermally connected to the thermal load for drawing heat away from the thermal load.

3. A thermal radiative system as set forth in claim 1 wherein said thermal switch means includes means selectively operable, in one instance, for connecting the thermal load to said thermal radiator means and, in another instance, for disconnecting the thermal load from said thermal radiator means.

4. A thermal radiative system as set forth in claim 2 wherein said PCM means includes:

a phase change reservoir; and phase change material which begins to melt when the temperature thereof is above a predetermined transition temperature and begins to freeze when the temperature thereof is below the transition temperature.

5. A thermal radiative system as set forth in claim 1 including:

radiator sensor means for detecting the temperature of said thermal radiator means;

load sensor means for detecting the temperature of the load;

computer means responsive to said radiator sensor means and to said load sensor means for operating said thermal switch means when the temperature difference between said radiator sensor means and said load sensor means is greater than a predetermined value.

6. A thermal radiative system as set forth in claim 1 including:

radiator sensor means for detecting heat transfer from said thermal radiator means; and computer means responsive to said radiator sensor means for operating said thermal switch means in one instance when the net heat transfer from said thermal radiator means is endothermic and in another instance when the net heat transfer from said thermal radiator means is exothermic.

7. A thermal radiative system as set forth in claim 1 including:

wherein the thermal load is mounted internally of the satellite.

8. A thermal radiative system for an earth orbiting satellite including a plurality of faces intermittently exposed to maximum solar illumination, said system comprising:

first thermal radiator means mounted on a first face of the satellite for discharging heat from a thermal load to deep space;

second thermal radiator means mounted on a second face of the satellite for discharging heat from a thermal load to deep space;

first heat conduction means extending between the thermal load and said first thermal radiator means;

second heat conduction means extending between the thermal load and said second thermal radiator means;

thermal switch means operable for sequentially connecting the thermal load to said first thermal radiator means and to said second thermal radiator means to achieve optimum discharge of heat from the thermal load to deep space, each of said thermal switch means including:

an elongated heat pipe including a length thereof in heat transfer proximity of said radiator means;

a gas reservoir in fluid communication with said heat pipe containing an entire charge of both a condensable gas and an inert non-condensable gas; and selectively operable heater means for heating said gases in said gas reservoir such that, when said heater means is operated, said non-condensable gas expands and forces said condensable gas into said heater pipe thereby disconnecting the thermal load from said thermal radiator means and, such that, when said heater means not operated, said condensable gas and said non-condensable gas both retreat into said gas reservoir thereby disconnecting the thermal load from said thermal radiator means.

9. A thermal radiative system as set forth in claim 8 wherein said thermal switch means includes phase change management (PCM) means thermally connected to the thermal load for isothermally absorbing from the thermal load.

10. A thermal radiative system as set forth in claim 9 wherein said thermal switch means is operable for connecting the thermal load to said first thermal radiator means when the difference in temperature between the thermal load and said first thermal radiator means is greater than a predetermined level and for simultaneously disconnecting the thermal load from said second thermal radiator means when the difference in temperature between the thermal load and said second thermal radiator means is below a predetermined level, and wherein said thermal switch means is operable for connecting the thermal load to said second thermal radiator means when the difference in temperature between the thermal load and said second thermal radiator means is greater than a predetermined level and for simultaneously disconnecting the thermal load from said first thermal radiator means when the difference in temperature between the thermal load and said first thermal radiator means is below a predetermined level.

11. A thermal radiative system as set forth in claim 8 including:

phase change management (PCM) means thermally connected to the thermal load for isothermally adsorbing heat from the thermal load.

12. A thermal radiative system as set forth in claim 8 including:

first and second radiator sensor means for detecting the temperature of said first and second thermal radiator means, respectively;

load sensor means for detecting the temperature of the load; and computer means responsive to said first and second radiator sensor means and to said load sensor means for operating said thermal switch means in one instance for connecting the thermal load to said first thermal radiator means when the difference in temperature between the thermal load and said first thermal radiator means is greater than a predetermined level and for simultaneously disconnecting the thermal load from said second thermal radiator means when the difference in temperature between the thermal load and said second thermal radiator means is below a predetermined level and, in another instance, for connecting the thermal load to said second thermal radiator means when the difference in temperature between the thermal load and said second thermal radiator means is greater than a predetermined level and for simultaneously disconnecting the thermal load from said first thermal radiator means when the difference in temperature between the thermal load and said first thermal radiator means is below a predetermined level.

13. A thermal radiative system as set forth in claim 8 including:

computer means responsive to said first and second radiator sensor means and to said load sensor means for operating said thermal switch means when the temperature difference between said first radiator sensor means and said load sensor means is greater than a predetermined value and for operating said thermal switch means when the temperature difference between said second radiator sensor means and said load sensor means is greater than a predetermined value.

14. A thermal radiative system as set forth in claim 8 including:

first radiator sensor means for detecting heat transfer from said first thermal radiator means;

second radiator sensor means for detecting heat transfer from said second thermal radiator means; and computer means responsive to said first and second radiator sensor means for operating said thermal switch means in one instance when the net heat transfer from said thermal radiator means is endothermic and in another instance when the net heat transfer from said thermal radiator means is exothermic.

15. A thermal radiative system as set forth in claim 8 wherein the thermal load is mounted internally of the satellite.

16. A method of optimizing radiative cooling from a satellite comprising the steps of:

(a) providing first and second thermal radiators mounted on first and second faces, respectively, of the satellite for discharging heat from a thermal load to deep space;

(b) to achieve optimum discharge of heat from the thermal load to deep space, thermally connecting the thermal load to the first radiator so long as the first radiator is exothermic;

(c) thermally disconnecting the thermal load from the first radiator when the first radiator becomes endothermic;

(d) thermally connecting the thermal load to the second radiator so long as the second radiator is exothermic;

(e) thermally disconnecting the thermal load from the second radiator when the second radiator becomes endothermic;

(f) thermally disconnecting the thermal load from the first radiator when the first radiator becomes endothermic;

(g) thermally connecting the thermal load to the second radiator so long as the second radiator is exothermic; and (h) providing thermal switch means including an elongated heat pipe including a length thereof in heat transfer proximity of said radiators and a gas reservoir in fluid communication with said heat pipe containing an entire charge of both a condensable gas and an inert non-condensable gas; and (i) selectively operating heater means for heating the gases in said gas reservoir such that, when said heater means is operated, said non-condensable gas expands and forces said condensable gas into said heater pipe thereby disconnecting the thermal load from said thermal radiators and, such that, when said heater means is not operated, said condensable gas and said non-condensable gas both retreat into said gas reservoir thereby disconnecting the thermal load from said thermal radiators.

17. A method of optimizing radiative cooling as set forth in claim 16 wherein step (b) includes the steps of:
(c) thermally connecting the thermal load to the first radiator so long as the first radiator is exothermic;
(d) thermally disconnecting the thermal load from the first radiator when the first radiator becomes endothermic;
(e) thermally connecting the thermal load to the second radiator so long as the second radiator is exothermic; and
(f) thermally disconnecting the thermal load from the second radiator when the second radiator becomes endothermic.

18. A method of optimizing radiative cooling as set forth in claim 17 wherein step (c) includes the steps of:
(d) thermally disconnecting the thermal load from the first radiator when the first radiator becomes endothermic; and
(e) thermally connecting the thermal load to the second radiator so long as the second radiator is exothermic.

19. A thermal radiative system for an earth orbiting satellite including a plurality of faces, said system comprising:

first and second thermal radiator means mounted on opposed faces of the satellite intermittently exposed to maximum solar illumination for recurrently discharging heat from a thermal load to deep space;

a third thermal radiator means mounted on a face of the satellite minimally exposed to solar illumination for continuously discharging heat from the thermal load to deep space;

heat conduction means extending between the thermal load and each of said first, second, and third thermal radiator means, said heat conducting means continuously thermally connecting the thermal load to said third radiator means; and thermal switch means operable for sequentially thermally connecting the thermal load to said first thermal radiator means and to said second thermal radiator means to achieve optimum discharge of heat from the thermal load to deep space;

said thermal switch means including:

first thermal switch means operable for connecting the thermal load to said first thermal radiator means when the difference in temperature between the thermal load and said first thermal radiator means is greater than a predetermined level and for simultaneously disconnecting the thermal load from said second thermal radiator means when the difference in temperature between the thermal load and said second thermal radiator means is below a predetermined level, and second thermal switch means operable for connecting the thermal load to said second thermal radiator means when the difference in temperature between the thermal load and said second thermal radiator means is greater than a predetermined level and for simultaneously disconnecting the thermal load from said first thermal radiator means when the difference in temperature between the thermal load and said first thermal radiator means is below a predetermined level, each of said first and second thermal switch means including:

an elongated heat pipe including a length thereof in heat transfer proximity of said associated radiator means;

a gas reservoir in fluid communication with said heat pipe containing an entire charge of both a condensable gas and an inert non-condensable gas; and selectively operable heater means for heating said gases in said gas reservoir such that, when said heater means is operated, said non-condensable gas expands and forces said condensable gas into said heater pipe thereby disconnecting the thermal load from said thermal radiator means and, such that, when said heater means not operated, said condensable gas and said non-condensable gas both retreat into said gas reservoir thereby disconnecting the thermal load from said thermal radiator means.

20. A thermal radiative system as set forth in claim 19 including:

first and second radiator sensor means for detecting the temperature of said first and second thermal radiator means, respectively;

load sensor means for detecting the temperature of the load; and computer means responsive to said first and second radiator sensor means and to said load sensor means for operating said thermal switch means in one instance for connecting the thermal load to said first thermal radiator means when the difference in temperature between the thermal load and said first thermal radiator means is greater than a predetermined level and for simultaneously disconnecting the thermal load from said second thermal radiator means when the difference in temperature between the thermal load and said second thermal radiator means is below a predetermined level and, in another instance, for connecting the thermal load to said second thermal radiator means when the difference in temperature between the thermal load and said second thermal radiator means is greater than a predetermined level and for simultaneously disconnecting the thermal load from said first thermal radiator means when the difference in temperature between the thermal load and said first thermal radiator means is below a predetermined level.

21. A thermal radiative system as set forth in claim 19 including:

computer means responsive to said first and second radiator sensor means and to said load sensor means for operating said thermal switch means when the temperature difference between said first radiator sensor means and said load sensor means is greater than a predetermined value and for operating said thermal switch means when the temperature difference between said second radiator sensor means and said load sensor means is greater than a predetermined value.

* * * * *

UNITED STATES PATENT AND TRADEMARK OFFICE
CERTIFICATE OF CORRECTION

PATENT NO. : 6,073,888　　　　　　　　　　　　　　　　　　　　　　　Page 1 of 1
DATED : June 13, 2000
INVENTOR(S) : Walter S. Gelon; John C. Hall; Christian J. Goodman It is certified that error appears in the above-identified patent and that said Letters Patent is hereby corrected as shown below:

On the cover page of Patent No. 6,073,888, the Assignee should read --Space Systems/Loral, Inc.-- and the residence is --Palo Alto, CA--.

Signed and Sealed this

Twelfth Day of June, 2001

*Attest:*

NICHOLAS P. GODICI
*Attesting Officer　　Acting Director of the United States Patent and Trademark Office*